(12) United States Patent
Stiegman

(10) Patent No.: US 6,391,808 B1
(45) Date of Patent: May 21, 2002

(54) METAL-SILICA SOL-GEL MATERIALS

(75) Inventor: Albert E. Stiegman, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 08/226,819

(22) Filed: Apr. 12, 1994

(51) Int. Cl.[7] .................................................. C03L 3/00

(52) U.S. Cl. ......................... 501/12; 423/326; 502/239

(58) Field of Search ...................... 423/326; 106/282.1; 501/12; 428/67, 406; 502/233, 237, 239; 516/111

(56) References Cited

U.S. PATENT DOCUMENTS

| | | | | |
|---|---|---|---|---|
| 4,795,687 A | * | 1/1989 | Suzuki et al. | 252/500 |
| 4,851,373 A | | 7/1989 | Hench et al. | 501/12 |
| 5,286,890 A | * | 2/1994 | Dougherty | 556/425 |

OTHER PUBLICATIONS

A. Ghosh, et al., *Appl. Phys. Lett.* 59(7):855–856 (1991) Aug.
N. Tohge, et al., *J. Non–Cryst. Solids* 63:95–103 (1984) (No Month).
A. Baiker, et al., *J. Catal.* 111:273–285 (1988) (No Month).
A.E. Stiegman, et al., *Chemistry of Materials* 5(11):1591–1594 (1993) Nov.
V.S. Nagarajan, et al., "Crystallization studies of $ZrO_2$–$SiO_2$ composite gels," *J. Materials Sci.* 24:2140–2146 (1989) (No Month).
N. Nogami, et al., "$ZrO_2$–Transformation–Toughened Glass–Ceramics Prepared by the Sol–Gel Process from Metal Alkoxides," *J. Am. Ceram. Soc.* 69:99–102 (1986) (No Month).

I.M.M. Salvado, et al., "$ZrO_2$–$SiO_2$ Materials Prepared by Sol–Gel." *J. Non–Cryst. Solids* 100:330–338 (1988).
K. Kamiya, et al., "Preparation of glass fibres of the $ZrO_2$–$SiO_2$ and $Na_2O$–$ZrO_2$ systems from metal alkoxides and their resistance to alkaline solution," *J. Materials Sci.* 15:1765–1771 (1980) (No Month).
M. Nogami, "Glass Preparation of the $ZrO_2$–$SiO_2$ Systems by the Sol–Gel Process from Metal Alkoxides," *J. Non–Cryst. Solids* 69:415–423 (1985) (No Month).

(List continued on next page.)

*Primary Examiner*—Stuart L. Hendrickson
(74) *Attorney, Agent, or Firm*—McCuthen, Doyle, Povown & Enersen L.L.P.

(57) ABSTRACT

The present invention relates to a single phase metal-silica sol-gel glass formed by the co-condensation of a transition metal with silicon atoms where the metal atoms are uniformly distributed within the sol-gel glass as individual metal centers. Any transition metal may be used in the sol-gel glasses.

The present invention also relates to sensor materials where the sensor material is formed using the single phase metal-silica sol-gel glasses. The sensor materials may be in the form of a thin film or may be attached to an optical fiber. The present invention also relates to a method of sensing chemicals using the chemical sensors by monitoring the chromatic change of the metal-silica sol-gel glass when the chemical binds to the sensor.

The present invention also relates to oxidation catalysts where a metal-silica sol-gel glass catalyzes the reaction. The present invention also relates to a method of performing oxidation reactions using the metal-silica sol-gel glasses.

The present invention also relates to organopolymer metal-silica sol-gel composites where the pores of the metal-silica sol-gel glasses are filled with an organic polymer polymerized by the sol-gel glass.

17 Claims, 4 Drawing Sheets

OTHER PUBLICATIONS

T. Gunji, et al., "Preparation of $SiO_2$–$TiO_2$ Fibers From Polytitanosiloxanes," *J. Non–Cryst. Solids 107*:149–154 (1989) (No Month).

K–L Walther, et al., "Characterization of Vanadia/Silica Mixed Gel Catalysts by Electron Paramagnetic Resonance Spectroscopy at 110 K," *J. Chem. Soc. Faraday Trans.* 87(8):1217–1220 (1991) (No Month).

"Characterization of Vanadia/Silica Mixed Gel Catalysts by Vibrational Spectroscopy," *J. Catal. 116*:595–599 (1989) (No Month).

K.S. Lee, "Third–Order Optical Nonlinearity of Poly(thienylene Vinylene) /Silica Sol–Gel Composite", *Synthetic Metals*, 55–57 (1993) pp. 3992–3997 No Month.

M. Toki, et al., "Structure of poly(vinylpyrrolidone)–silica hybrid", *Polymer Bulletin 29*, (1992), pp. 653–660 No Month.

C. J. Wung, et al., "Poly(p–phenylene vinylene)–silica composite: a novel sol–gel processed non–linear optical material for optical waveguides", *Polymer*, 1991, vol. 32, No. 4, pp. 605–608 No Month.

E.J.A. Pope, et al., "Transparent silica gel–PMMA composite", *J. Mater.Res.* vol. 4, No. 4, Jul./Aug. 1989, pp. 1018–1026.

V. Mehrotra, et al., "Electrically conducting glasses: incorporation of polypyrrole in a porous $SiO_2$ matrix", *Journal of Non–Crystalline Solids 136* (1991), pp. 97–102 No Month.

B.R. Mattes, et al., "Polyaniline Sol–Gels and Their Third–Order Nonlinear Optical Effects", *Synthetic Metals*, 41–43 (1991), pp. 3183–3187 No Month.

* cited by examiner

METAL-SILICA SOL-GEL MATERIALS

This invention was made in the course of work done under NASA Prime Contract NAS 7-918 and is subject to the provisions of Public Law 96-517 (35 U.S.C. §202) under which NASA has certain rights to the invention.

TECHNICAL FIELD

The present invention generally relates to sol-gel glasses containing a relatively low concentration of metal centers, which glass has unique sensor and catalytic properties.

BACKGROUND ART

The application of the sol-gel process to the synthesis of dense oxide glasses and ceramics has been the subject of escalating interest because of the low fabrication temperatures and compositional flexibility provided by these materials. The sol-gel process utilizes the condensation reactions of silicon and/or metal alkoxides to provide a low temperature, synthetically flexible route to optical quality glasses.

The overall reaction for the synthesis of a silica sol-gel glass is:

$$Si(OR_1)_4 + 2H_2O \rightarrow SiO_2 + 4R_1OH;$$

wherein tetramethylorthosilicate (TMOS) and tetraethylorthosilicate (TEOS) are the most common silicon alkoxides used. The ultimate production of a glassy material by this route, however, is accomplished in four primary stages: gelation, aging, drying/stabilization, and densification. The general process for forming sol-gels is taught in C. J. Brinker and G. Scherer, *Sol-Gel Science: The Physics and Chemistry of Sol-Gel Processing* (Academic Press, Boston, 1990) which is incorporated herein by reference.

The gelation step is composed of a series of condensation reactions in which silicon alkoxide condenses in the presence of water to form a Si—O—Si bonded network and alcohol by-products. The "gel" that forms from the condensation reactions is soft and contains incompletely reacted material (remaining SiOH and $SiOR_1$ functional groups), trapped organics ($R_1OH$) and water. Aging of this gel (~3 months) results in further condensation to form Si—O—Si linkages (which is accompanied by a large amount of shrinkage) and the evaporation of water and $R_1OH$. The aged gels are dried (~100° C.) and stabilized (~500° C.) to remove any remaining organic material and to complete the condensation process.

The material remaining after stabilization, known as "xerogel," has the properties of a hard, transparent glass, not unlike conventional fused silica glass. However, unlike fused silica glass, xerogel is porous with surface areas on the order of 200 $m^2/g$. This pore structure can ultimately be closed at temperatures above 1000° C. to yield a glass that is indistinguishable from fused silica glass.

The undensified silica xerogel material is unique because of its porous nature. Silica xerogels, acting as a host matrix, can be used to entrap and stabilize reactive chemical species while at the same time permitting small molecules to diffuse into the silica matrix and react. This imparts the reactivity of a particular functional group to an otherwise inert matrix.

Many of the materials made previously by the co-condensation of transition metals and silicon alkoxides have utilized relatively high metal concentrations and are often sintered into dense glasses. $TiO_2$/silica sol-gels have been described extensively because of their importance as low thermal expansion glasses. Similarly, a good deal of work has also been reported on $ZrO_2$ silicas. Recently, the properties of several $SiO_2/V_2O_5$ materials have also been reported, including the bulk properties of densified glasses. A. Ghosh, et al., *Appl. Phys. Lett.,* 59:855 (1991); N. Tohge, et al., *J. Non-Cryst. Solids,* 63:95 (1984).

Baiker, et al. have described the selective catalytic reduction of nitric oxide with stabilized $SiO_2/V_2O_5$ xerogels that showed the highest catalytic activities at $V^{5+}$ concentrations between 1 and 10%. A. Baiker, et al., *J. Catal.,* 111:273 (1988).

The present invention relates to silica sol-gel compositions comprising relatively low concentrations of transition metals and uses thereof.

SUMMARY OF THE INVENTION

The present invention relates to a single phase metal-silica sol-gel glass formed by the co-condensation of a transition metal with silicon atoms where the metal atoms are uniformly distributed within the sol-gel glass as individual metal centers. Any transition metal may be used in the sol-gel glasses.

The present invention also relates to sensor materials where the sensor material is formed using the single phase metal-silica sol-gel glasses. The sensor materials may be in the form of a thin film or may be attached to an optical fiber. The present invention also relates to a method of sensing chemicals using the chemical sensors by monitoring the chromatic change of the metal-silica sol-gel glass when the chemical binds to the sensor.

The present invention also relates to thermal and photochemical oxidation catalysts where a metal-silica sol-gel glass catalyzes the reaction. The present invention also relates to a method of performing oxidation reactions using the metal-silica sol-gel glasses.

The present invention also relates to organopolymer metal-silica sol-gel composites where the pores of the metal-silica sol-gel glasses are filled with an organic polymer polymerized by the sol-gel glass.

BRIEF DESCRIPTION OF THE DRAWINGS

The invention will be better understood by reference to the appended Figures, of which:

FIG. 3 depicts the NMR spectra of a stabilized metal-silica sol-gel containing 0.5 mol % V.

DETAILED DESCRIPTION OF THE INVENTION

Figure 1:
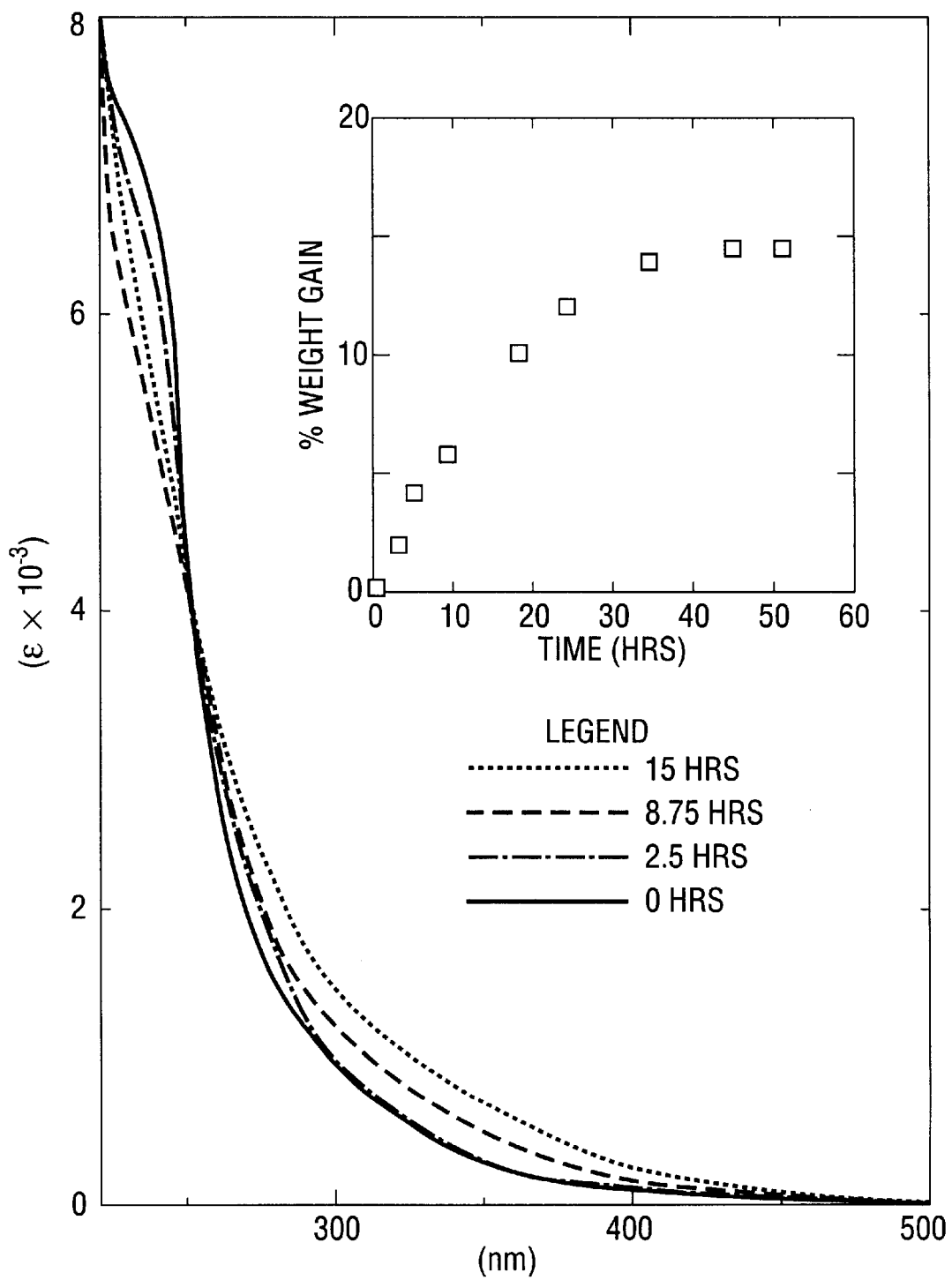
FIG. 1 depicts changes in the optical absorption spectrum of vanadium-silica sol-gel upon the absorption of water.

The present invention relates to metal-silica sol-gel glasses containing relatively low concentrations of metal centers such that a single phase sol-gel glass is formed having a predominantly uniform distribution of individual metal centers. Without being bound by theory, it is believed that the uniform distribution of individual metal centers within the silica matrix imparts unusual properties to the composition. The metal-silica sol-gel glasses of the present invention, and applications thereof, is described in A. E.

Stiegman, et al., *Chemistry of Materials* 5:11 1591 (1993), which is incorporated herein by reference.

Any transition metal may be used in the metal-silica sol-gel glasses of the present invention. Selection of the particular transition metal, or mixture of transition metals to incorporate into metal-silica sol-gel will depend on the functional properties desired of the metal-silica sol-gel.

The metal used must be available as a complex, usually an alkoxide or an acetylacetonate, that undergoes one of the following condensation reactions that leads to a sol-gel glass material:

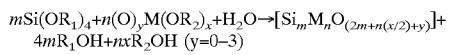

$mSi(OR_1)_4 + n(O)_y M(OR_2)_x + H_2O \rightarrow [Si_m M_n O_{(2m+n(x/2)+y)}] + 4mR_1OH + nxR_2OH$ (y=0–3)

These sol-gel glasses are hard, inorganic materials which maintain their mechanical and chemical integrity over a fairly wide temperature range (~–196° to 500° C.). For example, vanadium containing sol-gel glass has been processed at temperatures in excess of 500° C. without compromising its properties.

The metal-silica sol-gels of the present invention may be prepared by the traditional sol-gel process by the co-condensation of a metal alkoxide ($M(OR_2)_n$) or an oxo-metal alkoxide ($OM(OR_2)_n$) with a tetraalkylorthosilicate (($SiOR_1)_4$).

As noted above, it is believed that the uniform distribution of individual metal centers within the silica matrix imparts unusual properties to the composition. The transition metal to silicon ratio at which a single phase sol-gel glass having a predominantly uniform distribution of individual metal centers is produced depends on the tendency of each particular transition metal to form metal aggregates.

The upper ratio of transition metal to silicon that can be used to form the single phase sol-gel glass of the present invention is influenced by the particular $R_1$ and $R_2$ groups used in the tetraalkylorthosilicate and metal alkoxide respectively. By using bulky alkyl groups for $R_2$ and small alkyl groups for $R_1$, one is able slow the rate of the transition metal condensation reaction and accelerate the silicate condensation reaction, thereby facilitating the predominant formation of individual metal centers within the sol-gel.

One can readily determine whether individual metal centers have been predominantly formed within a particular sol-gel glass by inspecting the glass' optical quality. Aggregation of metal centers results in the non-uniform distribution of metal centers which in turn results in multiphase sol-gel materials. In the event that detrimentally high metal center aggregation is observed, aggregation can be reduced by reducing the concentration of metal alkoxide used, by using a bulkier $R_2$ group on the metal alkoxide and/or by using a less bulky $R_1$ group on the tetraalkylorthosilicate.

Preferred tetraalkylorthosilicates include tetramethylorthosilicate (TMOS) and tetraethylorthosilicate (TMES). Tetramethylorthosilicate is the most preferred because it provides the highest rate of silicate condensation. Preferred $R_2$ groups are isopropyl, butyl, sec-butyl and t-butyl since these bulky alkoxide groups slow the condensation of the metal alkoxide. Vanadium-silica sol-gels are preferably prepared using TMOS and oxovanadium triisopropoxide where the M/M ratio of vanadium to silicon is preferably less than $1 \times 10^{-2}$, most preferably between about $5 \times 10^{-5}$ and $5 \times 10^{-3}$.

The metal-silica sol-gel glasses of the present invention can be used as chemical sensors. The sensor properties of the sol-gel glasses appear to arise from the Lewis acidity of the metal centers within the silica matrix and the behavior of the metal centers as individual centers rather than metal aggregates. The silica matrix also serves to prevent secondary reactions, such as hydrolysis, thereby enabling small molecules to enter the pore system of the glass and coordinate with the metal center. The metal-silica sol-gel sensors of the present invention reversibly coordinate with the molecule being sensed, thereby enabling the sensors to be regenerated and reused.

The light absorption of the metal-silica sol-gel depends on the metal center and the molecules and ligands bound to the metal center. Different molecules produce different chromatic changes for a particular metal center. Thus, by monitoring the light absorption of a particular sol-gel glass, one is able to detect the presence of a variety of different molecules. Table 1 lists some of the molecules that bind to vanadium oxide silica sol-gel and the color caused by the coordination of the different molecules with the vanadium metal center.

TABLE 1

| Absorbed Molecule | Color |
| --- | --- |
| desiccated | clear |
| water | orange |
| hydrogen sulfide | amber |
| ammonia | yellow |
| acetonitrile | yellow |
| formic/acetic acid | green |
| formaldehyde | green |

As can be seen from Table 1, one can use the metal-silica sol-gel glasses of the present invention to differentiate a wide variety of molecules. Different metal centers have different compound selectivities and exhibit different light absorption patterns for the different metal-molecule complexes. Therefore, by using different metal centers and combinations of metal centers, one can devise metal-silica sol-gel sensors for a wide variety of applications.

The choice of a metal center to coordinate, and therefore sense, a particular small molecule can be predicted from known coordination chemistry and by using empirical rules such as hard-soft acid-base theory. For example, vanadium (+5) centers are high-valent early transition metals which would be predicted to coordinate "hard" bases, such as water and hydrogen sulfide, and be unreactive towards "soft" bases, such as pyridine. Thus, with regard to metal-silica sol-gel sensors, vanadium, niobium, molybdenum and tungsten are preferred for detecting $H_2S$, iron is preferred for detecting $SO_2$, iron, cobalt and nickel are preferred for detecting CO and iron, and chromium and molybdenum are preferred for detecting NO. Overall, particularly preferred transition metals for use in the metal-silica sol-gels of the present invention include vanadium, rhodium, ruthenium, iridium, lead, platinum, tin, nickel, palladium, niobium, molybdenum, tungsten, iron, cobalt, and chromium.

The pore size of the sol-gel can also influence the rate of molecular flow into the glass where an increase in the flow rate into the glass increases the response speed of the sensor. Modulation of sol-gel pore sizes by use of different acid and base catalysts is well known in the art. How one would modify the pore size of the sol-gel in order to achieve different chemical selectivity is similarly well known in the art.

The amount of light absorbed by the metal-silica sol-gel at a particular frequency is directly proportional to the concentration of the metal-molecule complexes present in the sol-gel. FIG. 1 depicts changes in the optical absorption spectrum of vanadium-silica sol-gel upon the absorption of water. As can be seen from FIG. 1, the metal-silica sol-gel compositions of the present invention may be used to quantify the amount of a particular molecule present with great sensitivity.

Ideally, one should be able to incorporate sensor materials directly into electronic or optical components to form the key sensing element of an active environmental control system. The metal-silica sol-gel glasses of the present invention are particularly well suited for use as sensors in view of the ease with which these materials may be molded and manipulated. By using pre-formed molds and allowing appropriately for shrinkage, optical components of any specific shape and size can be readily fabricated by the sol-gel process. In addition, the stabilized sol-gel glass, even though highly porous, can be ground and polished much like a conventional fused silica optic. Sol-gel solutions can also be spin-coated onto a flat substrate to produce thin films of high optical quality. This is extremely significant for micro-instrumentation applications since thin film technology greatly reduces the size of the sensing element and, in principle, allows the sensor component to be integrated into a single microchip which performs the entire sensing/analysis operation.

The excellent optical properties of the materials of the present invention, in conjunction with their ability to be processed into thin films, recommends their integration into an optically driven sensor device. Optical devices offer a number of inherent advantages over other sensing/detection methods. The detection and modulation of light can be performed with great sensitivity while extremely small optical components are commercially available which facilitates the fabrication of very small sensing devices.

Of particular recent interest is the use of fiber optic bundles as in-situ optical sensor devices. Fiber optics can channel light from one central source to the sensor element, and have the particular advantages of being flexible and extremely small (the diameter for a single mode fiber core ranges from 2 to 8 microns). Thin films of the silica-gel sensor elements can be easily applied to the end of an optical fiber making them extremely compatible with this type of device. An integrated sensor device, capable of sensing and discriminating between gases in a complex mixture can be prepared using these materials and a fiber optic bundle. By coating each fiber in the bundle with a different sensor element (engineered to detect a specific chemical specie), an integrated sensing process can be carried out whereby the output of each sensor element is not only read but compared with all of the other elements to accurately analyze the gas mixture. Such a multifunctional device should be much more accurate than a single sensor or a group of sensors read independently.

Thin optical films of the active sensor element are the most promising configuration for device applications, Films of 1 $\mu$m in thickness can be fabricated by dipping or spin coating the metal-silica sol-gel solution onto a substrate. After aging and drying, these films should have optical properties equal to those of monolithic components. The potential advantage of thin-film sensor elements over monolithic components is twofold: the large surface area and shallow depth will saturate quickly with the detectable species yielding a rapid response time while the sensitivity of the detection process will be greatly enhanced by monitoring the process optically through the long path-length of the film.

The metal-silica sol-gel glasses of the present invention can also be used as oxidation/reduction catalysts. The choice of metal center to use can be predicted from known coordination chemistry and transition metal catalysis. For example, vanadium-silica sol-gel glass was shown to turn from clear to sapphire blue upon being exposed to hydrogen gas at 490° C. As is known in the art, this color change reflects the reduction of $V^V$ to $V^{IV}$. The presence of the $V^{IV}$ species was confirmed by electron spin resonance (ESR) spectroscopy due to its characteristic eight-line spectrum resulting from hyperfine coupling to the $^{51}V$ nucleus. Vanadium-silica sol-gel gas has also been shown to activate methane. Photolysis (lambda>305 nm) of a 0.5 mol % vanadium-silica sol-gel under an atmosphere of methane turned the clear sol-gel glass a sapphire blue color. The presence of the $V^{IV}$ species was confirmed by ESR spectroscopy. Further, when the reaction is conducted at 77° K., the characteristic spectrum for methyl radicals is detected. Gas chromatographic analysis of the products verified the presence of ethane, the expected product of methyl radical recombination and trace amounts of propane resulting from subsequent atomic-abstraction recombination processes. The reduced vanadium center was observed to rapidly reoxidize, as evidenced by the fading of the blue color and the disappearance of the ESR signal. In fact, irradiation of the vanadium sol-gel under a 1/1 $CH_4/O_2$ mixture (1 atm) in the ESR cavity revealed the formation of methyl radicals. However, the ESR signal associated with $V^{IV}$ was not observed.

Yet another use of the invention relates to the formation of new organopolymer-silica nano-composite materials. In many cases, molecular species with desirable nonlinear optical properties have not been utilizable in actual devices due to factors as varied as their thermal and/or oxidative instability, poor optical properties or lack of processibility. Organopolymer-silica nano-composite materials which can be formed using the present invention are particularly advantageous for nonlinear optical applications in view of the ease with which sol-gel glasses can be shaped.

Figure 2:
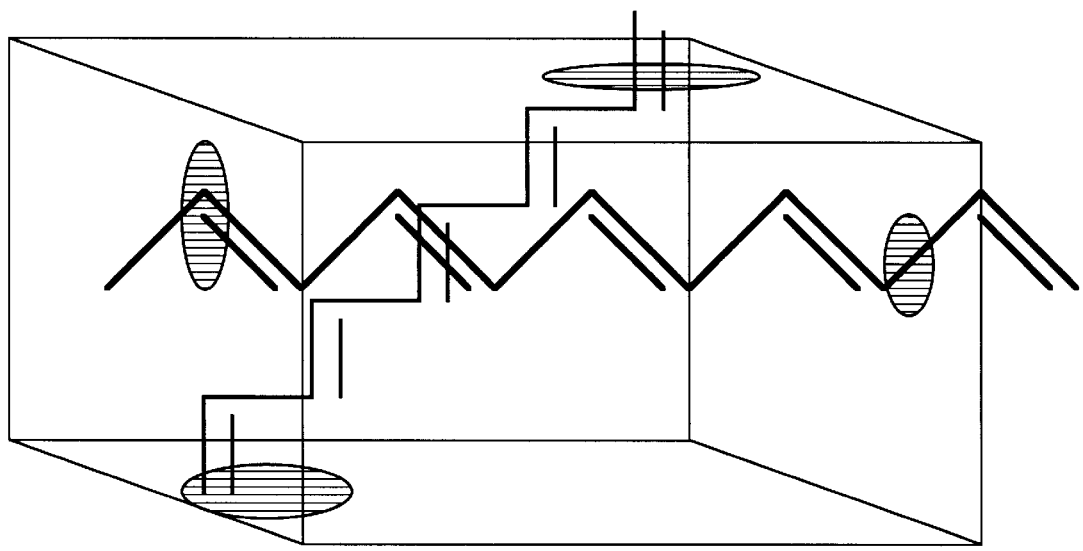
FIG. 2 provides a schematic depiction of organic polymers dispersed within a metal-silica sol-gel glass.

It is believed that the organic polymer in these new composites is microscopically dispersed within an optically transparent metal-silica sol-gel glass. This is accomplished by photopolymerizing the polymer precursor within the silica sol-gel matrix. FIG. 2 provides a schematic depiction of organic polymers dispersed within a metal-silica sol-gel glass.

The sol-gel glass matrix, which has the bulk properties of a hard transparent glass, is highly porous on a microscopic level and contains discrete vanadium-oxide centers which photochemically initiate the polymerization reaction. The results of this internal polymerization is a new hybrid material whose enhanced properties combine the unique nonlinear- and electro-optical properties of polyacetylene with the superior optical properties and excellent processibililty of a silica glass.

Fabrication of these polyacetylene nano-composites is easily accomplished under very mild conditions. To do so, silica-gel optical flats (doped at the 0.5 mol % level with vanadium oxide) are evacuated and subsequently back-filled to one atmosphere with acetylene gas. Exposure of the sample to UV-visible radiation ($\lambda$>300 nm) results in the immediate onset of a deep red color which is trans-polyacetylene forming in the matrix.

Polyacetylene is one of the most intensely studied and well understood of the conducting polymers. In its undoped state it is a highly conjugated semiconductor which, especially in the trans conformation, has appreciable third-order nonlinear optical properties (third-order susceptibilities ($\chi^{(3)}$) of $4\times10^{-10}$ esu have been measured for films of this material). However, the free-standing polymer is relatively intractable, making it difficult to process into usable optical samples for study or for the fabrication of devices such as optical switches. The nano-composites of the present invention provide the necessary medium for exploiting and applying this well established material in an actual device.

In a similar fashion, it is believed that these nano-composites will allow the doped form of polyacetylene, which is metallic and highly conducting, to be fashioned into electronic or electro-optical devices. For example, it should be possible to draw a polyacetylene "wire" into the composite with a narrowly focussed laser beam which, after doping, will yield a thin "molecular" wire embedded in the optical flat.

It should be emphasized that the procedure by which polyacetylene nano-composites are made can be used to produce a broad range of polymer containing nano-composites for a number of applications. Examples of nano-composites of other polymers include conducting polymers (e.g., polyaniline, polythiophene) and piezoelectric polymers (e.g., polyvinylidene fluoride). Composites of conventional insulating polymers, such as polyethylene, polymers sold under the Teflon brand, polymethylmethacrylate, etc. are also of interest for the production of graded refractive index glasses by varying the degree of polymerization over the length of an optical flat.

The following examples set forth the preferred synthesis of the sol-gel compositions of the present invention and illustrate some of their physical properties. Further objectives and advantages of the present invention, other than those set forth above, will become apparent from the examples which are not intended to limit the scope of the present invention.

EXAMPLES

1. Synthesis and Fabrication of Vanadium-Silica Sol-Gel Materials

Vanadium-silica sol-gel glasses are synthesized by the sol-gel process by the co-condensation of oxovanadium triisopropoxide with tetraethylorthosilicate (TEOS):

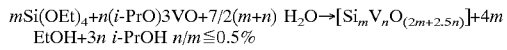

$m$Si(OEt)$_4$+$n$($i$-PrO)3VO+7/2($m$+$n$) H$_2$O→[Si$_m$V$_n$O$_{(2m+2.5n)}$]+4$m$ EtOH+3$n$ $i$-PrOH $n/m \leq 0.5\%$ Specifically, a solution of oxovanadium triisopropoxide of the desired vanadium concentration in isopropanol is added to 6 ml (0.027 mol) of TEOS. Isopropanol is then added to bring the total volume to 12 ml. 8 ml of a ⅓ isopropanol/water mixture is then added drop-wise while sonicating. Four milliliter aliquots of the resulting clear solution are placed into 1 cm polystyrene cuvettes, sealed, and allowed to gel. Sonication was used as the catalyst in this example. However, it should be noted that acid catalysts, such as HCl, and alkaline catalysts, such as NH$_4$O H, may also be used.

Gelation occurred in approximately two weeks at room temperature. After gelation, the seal was punctured and the materials were allowed to age for six months. Optically transparent vanadium-silica glass flats approximately 0.4× 0.4×1.25 cm in dimension remained after the aging process. These optical flats ranged from colorless to dark orange with increasing vanadium concentration. The orange color remained after drying (125° C., 1 week). However, upon stabilization at 500° C., all of the materials, regardless of vanadium concentration, became colorless.

This procedure consistently yields high quality optical monoliths that retain the geometry of the 1.0×1.0×4.0 polystyrene molds in which they are made. By using pre-formed molds and allowing appropriately for shrinkage, optical components of any specific shape and size can be readily fabricated. Additionally, the stabilized vanadium-silica glass, even though highly porous, can be ground and polished much like a conventional fused silica optic. The sol-gel solutions can also be spin-coated onto a flat substrate to produce thin films of high optical quality.

Figure 3A:
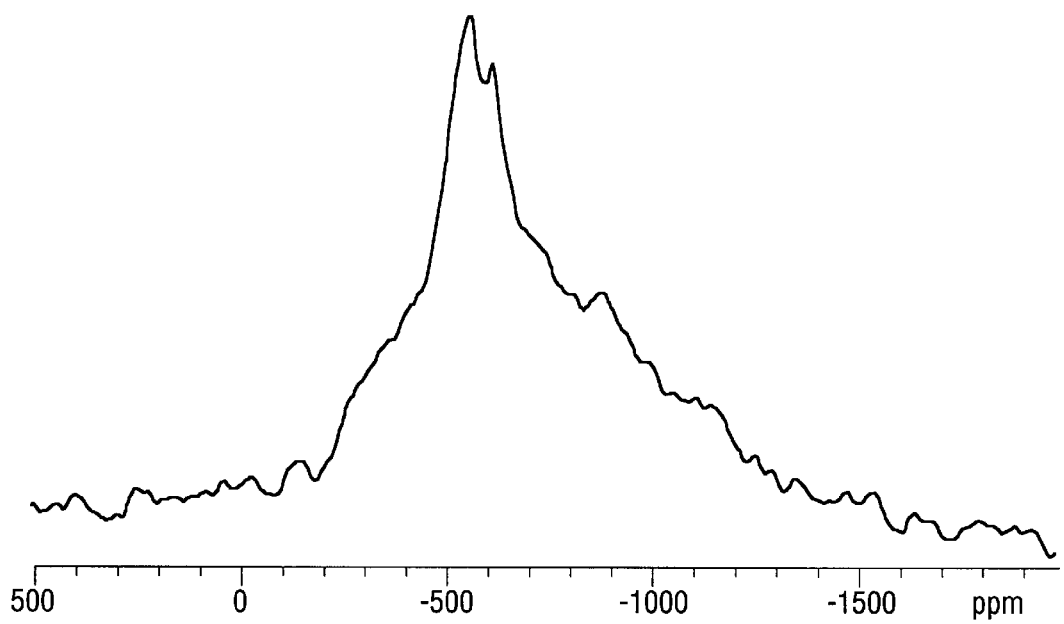
FIG. 3a depicts the NMR spectrum of a hydrated vanadium sol-gel.
Figure 3B:
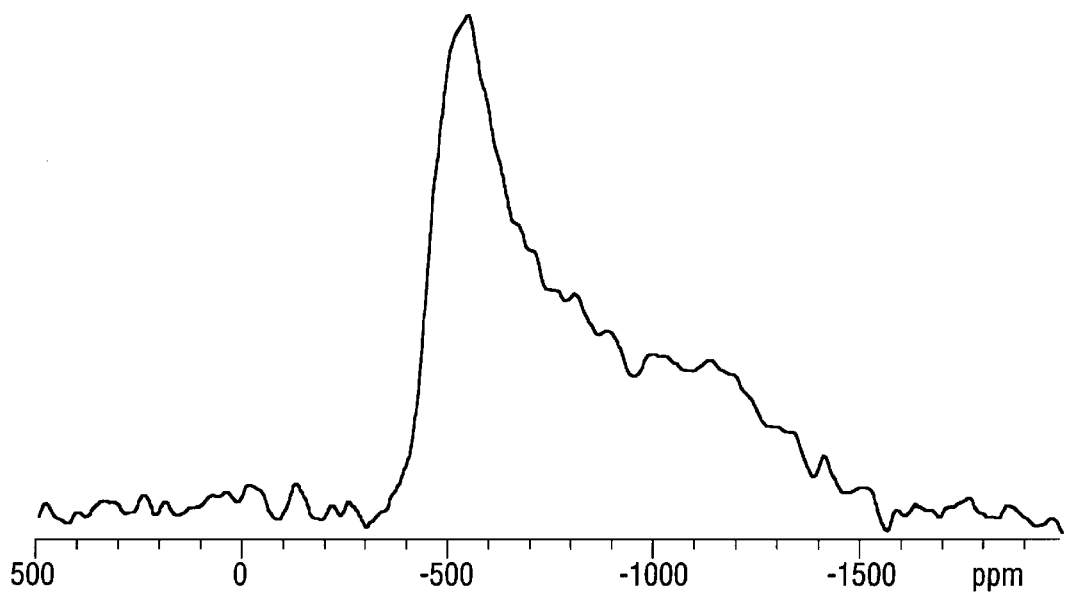
FIG. 3b depicts the NMR spectrum of a desiccated vanadium sol-gel.
Figure 4:
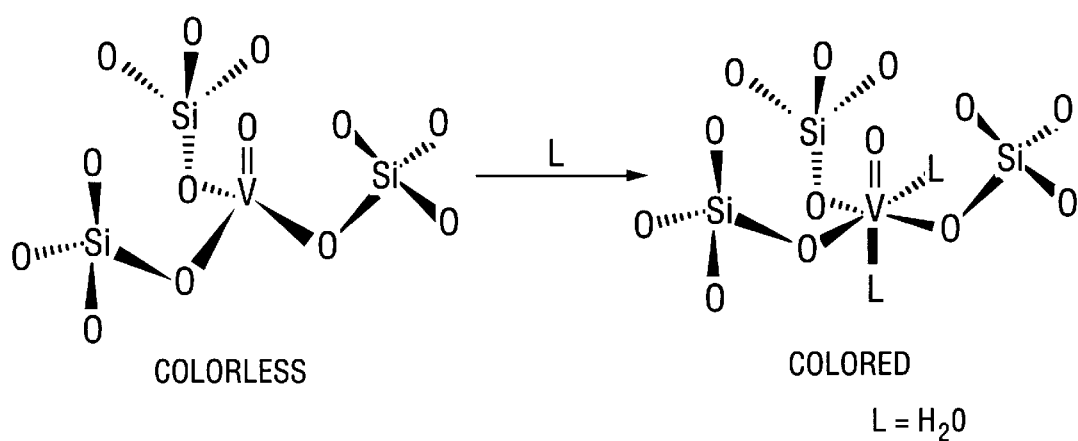
FIG. 4 depicts the proposed structures of hydrated and desiccated vanadium sol-gel.

The specific coordination environment of the vanadium in the silica matrix was probed directly by solid-state [51]V NMR spectroscopy. The NMR spectra of a stabilized metal-silica sol-gel containing 0.5 mol % V is shown in FIG. 3. FIG. 3$a$ depicts the NMR spectrum of a hydrated vanadium sol-gel. FIG. 3$b$ depicts the NMR spectrum of a desiccated vanadium sol-gel. The static spectrum of the dehydrated material reveals an axially symmetric chemical shift tensor with $\delta_\parallel$ and $\delta_\perp$ values of −1250±50 and −500±20 ppm vs VOCl$_3$, respectively. Previous studies of discrete vanadium compounds with known local environments have shown that the anisotropic chemical shift properties of the [51]V nucleus are highly diagnostic of the coordination geometry. In particular, the line shape observed for the dehydrated sample, shown in FIG. 3$a$, is unique to a pseudotetrahedral O=VO$_{3/2}$ coordination environment and has been previously observed for vanadium oxide monolayers on a dehydrated SiO$_2$ surface. An intense transition in the FT-IR spectrum at 935 cm$^{-1}$ is also observed. This transition, which is absent in pure silica and whose intensity depends on the vanadium concentration, is characteristic of terminal vanadium-oxygen bonds. Taken together, these results suggest that the structure of the vanadium in the silica framework is one of local pseudotetrahedral geometry possessing a short terminal (V=O) bond and three long vanadium oxygen bonds which are connected to the silica. The proposed structures of desiccated and hydrated vanadium sol-gel is shown in FIG. 4.

2. Chemical Sensing Properties

Exposure of the colorless stabilized vanadium-silica flats to humidity results in a rapid weight gain from the uptake of water, as shown in FIG. 1, and a concomitant color change from colorless to orange.

The evolution of UV-Vis spectrum as a function of water absorption is shown in FIG. 1. The spectrum of the dehydrated materials has an intense transition appearing as a shoulder at 235 nm ($\epsilon$=8×10$^3$) which rapidly diminishes as water is absorbed. Meanwhile, a low energy shoulder at 340 nm emerges as water is absorbed.

These spectral changes are due to direct coordination of water molecules to the vanadium metal center which converts the pseudotetrahedral environment to one of a higher coordination number. The tendency of pseudohedral VV compounds to increase their coordination sphere by either adding ligands or through oligomerization is well documented as are the color changes associated with it.

Due to the high optical transparency of the silica-gel glass, the color change can be monitored quantitatively and with great sensitivity by spectroscopic means, an important prerequisite for solid-state optical sensing applications.

Other small molecules also coordinate to the vanadium center, often imparting a characteristic color to the material. For example, the vanadium sol-gel glass turns deep amber and dark green when exposed to hydrogen sulfide and formic acid, respectively. In addition, ammonia is observed to turn the vanadium-silica sol-gel very pale yellow. Meanwhile, formaldehyde-coordinated material is bright yellow. The vanadium-silica sol-gel also exhibits a distinct coordinating preference along with these chemical sensing properties. The sorption of formaldehyde appears to be favored over that of water, which in turn is clearly favored over that of ammonia.

It has been found that vanadium-silica sol-gel desorbs species such as water, formaldehyde and- ammonia at relatively mild elevated temperatures (<150° C.) while other species (e.g., $H_2S$) are difficult to remove.

While the present invention is disclosed by reference to the preferred embodiments and examples detailed above, it is to be understood that these examples are intended in an illustrative rather than limiting sense, as it is contemplated that modifications will readily occur to those skilled in the art, which modifications will be within the spirit of the invention and the scope of the appended claims.

What is claimed is:

1. A sensor material wherein the material comprises a single phase undensified metal-silica sol-gel derived glass, the glass exhibiting chromatic changes that detect the presence of chemical species and comprising tin atoms and silicon atoms wherein the tin atoms are uniformly distributed with the sol-gel derived glass as individual metal centers.

2. A sensor material according to claim 1, wherein the single phase undensified metal-silica sol-gel derived glass is formed according to a method comprising the step of co-condensing a metal complex with a tetraalkylorthosilicate.

3. A sensor material according to claim 2, wherein the metal complex is a metal alkoxide, an oxometal alkoxide or a metal acetylacetonate.

4. A sensor material according to claim 1 wherein the sensor material is in the form of a thin film.

5. A sensor material according to claim 1 wherein the material is attached to an optical fiber.

6. A polymerization catalyst, wherein the catalyst is comprised of a photoresponsive single phase undensified metal-silica sol-gel derived glass comprising tin atoms and silicon atoms wherein the metal atoms are uniformly distributed with the sol-gel derived glass as individual metal centers and wherein the photoresponse of the metal atoms initiates polymerization.

7. A polymerization catalyst according to claim 6, wherein the photoresponsive single phase metal-silica sol-gel derived glass is formed according to a method comprising the step of photopolymerizing a polymer precursor within the silica sol-gel matrix.

8. A polymerization catalyst according to claim 6, wherein the photoresponsive single phase metal-silica sol-gel derived glass is formed according to a method comprising the step of co-condensing a metal complex with a tetraalkylorthosilicate.

9. A polymerization catalyst according to claim 8, wherein the metal complex is a metal alkoxide, an oxometal alkoxide or a metal acetylacetonate.

10. A sensor material according to claim 9, wherein the metal complex is a metal alkoxide, an oxometal alkoxide or a metal acetylacetonate.

11. A single phase undensified metal-silica sol-gel derived optically transparent glass comprising tin atoms and silicon atoms in which the tin metal atoms are uniformly distributed as individual metal centers within the sol-gel derived glass and the glass is formed according to a method comprising the step of co-condensing a metal complex with a tetraalkylorthosilicate.

12. A single phase undensified metal-silica sol-gel derived optically transparent glass according to claim 11, wherein the metal complex is a metal alkoxide, an oxometal alkoxide or a metal acetylacetonate.

13. A sensor material wherein the material comprises a single phase metal-silica sol-gel derived glass, the glass exhibiting chromatic changes that detect the presence of chemical species and comprising vanadium and silicon atoms wherein the vanadium atoms are uniformly distributed within the sol-gel derived glass as individual metal centers and wherein the mole fraction of vanadium is less than $1 \times 10^{-2}$.

14. A sensor material according to claim 13, wherein the single phase metal-silica sol-gel derived glass is formed according to a method comprising the step of co-condensing a metal complex with a tetraalkylorthosilicate.

15. An organopolymer metal-silica sol-gel composite comprising a single phase metal-silica sol-gel glass comprising transition metal and silicon atoms wherein the metal atoms are uniformly distributed within the sol-gel glass as individual metal centers and an organic polymer, wherein the metal-silica sol-gel glass has pores filled with the organic polymer.

16. An organopolymer metal-silica sol-gel composite according to claim 15 wherein the polymer is selected from the group consisting of polyacetylene, polyaniline, polythiophene and polyvinylidene fluoride.

17. An organopolymer metal-silica sol-gel composite according to claim 15, wherein the glass is optically transparent.

* * * * *